United States Patent [19]

Gierer

[11] Patent Number: 5,005,445
[45] Date of Patent: Apr. 9, 1991

[54] ELECTRIC-HYDRAULIC CONTROL FOR AUTOMATIC TRANSMISSION

[75] Inventor: Georg Gierer, Kressbronn, Fed. Rep. of Germany

[73] Assignee: Zahnradfabrik Friedrichshafen AG, Friedrichshafen, Fed. Rep. of Germany

[21] Appl. No.: 272,701
[22] PCT Filed: Apr. 23, 1987
[86] PCT No.: PCT/EP87/00220
 § 371 Date: Oct. 26, 1988
 § 102(e) Date: Oct. 26, 1988
[87] PCT Pub. No.: WO87/06670
 PCT Pub. Date: Nov. 5, 1987

[30] Foreign Application Priority Data
 May 2, 1986 [LU] Luxembourg ...... PCT/EP86/00261

[51] Int. Cl.5 .................. F16H 61/12; F16H 61/16
[52] U.S. Cl. ........................... 74/878; 74/861; 74/866
[58] Field of Search ............. 74/878, 866, 862, 861

[56] References Cited
U.S. PATENT DOCUMENTS

| 4,246,990 | 1/1981 | Strantz | 74/878 X |
| 4,419,909 | 12/1983 | Opperud et al. | 74/878 X |
| 4,733,582 | 3/1988 | Eggert et al. | 74/866 X |
| 4,896,568 | 1/1990 | Gierer | 74/867 X |

FOREIGN PATENT DOCUMENTS
 2109064 5/1983 United Kingdom .................. 74/878

Primary Examiner—Allan D. Herrmann
Assistant Examiner—Khoi Q. Ta
Attorney, Agent, or Firm—Herbert Dubno

[57] ABSTRACT

Electric-hydraulic control for an automatic transmission (1) with a selecting slide (4), at least for the neutral position (N), as well as the forward drive position (D) and the reverse drive position (R), an electronic control device (5), which is connected to at least one sensor (55) for detecting the gear output speed, with solenoid valves (6, 65) held in neutral position by spring force, a pressure-medium source (7), pressure-control valves (8) and switch valves (9) and dampers for the actuation of gear-selecting clutches and -brakes (A-E) as well as with a R-gear safety mechanism which is created by the cooperation of a solenoid valve (6) and a switch valve (9), both of them being already used in other gear-selecting operations. The solenoid valve (6) is either immediately switched by moving the selecting slide (4) into the R-gear when the speed of the forward motion reaches or falls below a definite value, or the switching is interrupted until the speed of forward motion reaches or falls below the definite value. The electronic control device (5) switches off the solenoid valve (6), whereby the R-gear coupling B and -brake (D) are activated by the operational pressure via the switching valve (9).

9 Claims, 2 Drawing Sheets

|  | A | B | C | C' | D | E | MV1 | MV2 | MV3 |
|---|---|---|---|---|---|---|---|---|---|
| G.1 | X |  |  |  | (X) |  | X | X | X |
| G.2 | X |  | X | X |  |  | 0 | X | X |
| G.3 | X |  | X |  |  | X | 0 | 0 | X |
| G.4 |  |  | X | X | X |  | X | 0 | X |
| G.R |  | X |  |  | X |  | 0 | 0 | 0 |

ELECTRIC-HYDRAULIC CONTROL FOR AUTOMATIC TRANSMISSION

CROSS REFERENCE TO RELATED APPLICATIONS

This application is a national phase application corresponding to PCT/EP87/00220 filed 23 Apr. 1987 and based, in turn, upon an application filed in Luxembourg as PCT/EP86/00261 filed 2 May 1986 under the International Convention.

This invention relates to an electric-hydraulic control for an automatic transmission of the type in which a selecting slide serves at least for the selection of the neutral position (N), as well as the forward drive (D) and the reverse drive (R), an electronic control device is connected to a sensor for detecting the gear output speed, solenoid valves, kept in neutral position by spring force, a pressure-medium source, pressure-control valves and switch valves and dampers for the actuation of gear shifting couplings and brakes, as well as safety mechanism to prevent shifting into the R-gear when the forward-drive speed is too high.

BACKGROUND OF THE INVENTION

From the point of view of safety, in the case of automatic transmissions there are known devices which prevent a shifting into reverse gear through the setting of the selecting slide or manual valve in the position R by the driver when there is an excessively high driving speed and the vehicle rolls fowardly too quickly. Such devices are necessary in spite of the increased structure involved, in order to avoid damage in the transmission line, primarily in the gears, in the case of impermissible shifting into reverse gear.

In a known automatic transmission 4HP22 with an electronic-hydraulic control—ATZ 85 (1983) pages 401 to 405—such an inadmissible shifting is prevented by providing an additional solenoid valve and an additional reverse-speed safety valve especially designed for this purpose.

This arangement has proven to be suitable, since shifting of the manual valve into reverse does not lead to shifting in the transmission as long as the vehicle continues to rolls forwardly at a speed of over 8 km/h. However, the device is relatively complex.

OBJECT OF THE INVENTION

It is the object of the invention to provide an improved electric-hydraulic control of simplified construction without impairing the safety function in the case of impermissible shifting into the R-gear.

SUMMARY OF THE INVENTION

This object is attained in accordance with the invention by providing a solenoid valve and a hydraulic switch valve, both of which are necessary also for other gear selection operations. The solenoid valve is either immediately switched on by moving the manual valve into the R-speed when the speed of forward motion falls below a definite speed, or when the speed is still to high the switching is discontinued. When the speed falls below an established value, the electronic control apparatus switches off the solenoid valve and thereby the switch valve is reset for the actuation of the R-speed clutch and the R-speed brake. The hydraulic switch valve can have a sleeve valve with four control pistons and a stop pin which is arranged to be axially slidable in a housing with a bore and nine annular spaces. The sleeve value is biased into an end position by the force of a compression spring arranged around the stop pin. The control pistons cooperate with the annular spaces to lead into the ducts or to vent them.

The first frontal annular space for the actuation with control pressure is connected with a first solenoid valve via control duct and a control valve as well as another duct. System pressure is supplied via the manual valve in the position (D) and a duct to the second annular space and a clutch in the position of the first gear space through a duct with the sixth annular space and in the position (R) through a duct with the seventh annular space. From the third annular space ducts lead to a further switch valves and clutches. The fourth and the ninth annular space, as well as the spring space are vented. The fifth annular space is connected with a brake via a duct and a ball valve. The eighth annular space is connected to the clutch via a duct and a ball valve and to the brake via a ball valve. When the position of the manual valve is shifted from forward drive (D; speed 1) into the reverse gear (R) when the forward motion exceeds a definite value, the switch valve remains in the right end position and thereby the supply operational pressure via the duct and the seventh annular space to the R-speed clutch and the R-speed brake is cut off through the third control piston.

When the position of manual valve is shifted from the forward drive position (D; speed 1) into the reverse gear (R) when the speed of the forward motion has fallen below a definite value, the solenoid valve is switched off via the electronic control device and the duct and, via the control valve the duct and the frontal annular space are vented. The sleeve valve is pressed into the left end position by the compression spring and the operational pressure can close the R-speed clutch as well as the R-speed brake from the seventh annular space through the eighth annular space and duct and both ball valves.

Thus the arrangement of a solenoid valve and a switch valve, e.g. of the switch valve for first-second speeds and of the first solenoid valve and by their use also for the R-speed makes it possible to save one solenoid valve and one R-speed safety valve. In the preferred embodiment it suffices to enlarge the spool valve in the switch valve 1-2 by one control piston. Generally, by this dual use of a switch valve and a solenoid valve considerable savings result.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figures 1, 2:
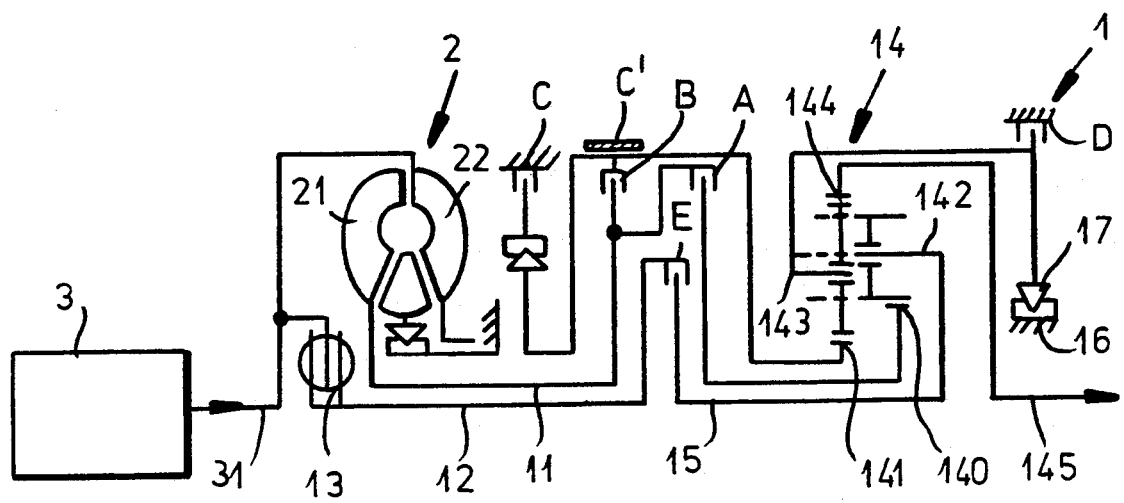
FIG. 1 is a schematic representation of an automatic transmission.
FIG. 2 is a table showing the clutches and brakes involved in each of the individual speeds.

In FIG. 1, a driving engine 3 is shown to be cocnnected by driven shaft 31, on one hand to a pump 22 of a hydrodynamic unit 2, and on the other hand, over a damper 13, with a second primary shaft 12, at whose end a clutch E is arranged. The clutch E connects to an internal shaft 15 to a planet carrier 142 of a step-down planetary coupling gear 14. The first primary shaft 11 leads from the turbine 21 of the hydrodynamic unit 2 to the clutches A and B, whose other halves are connected each to a sun wheel 140, 141 of the step-down planetary gearing 14. On the second half of the clutch B, a brake C' and, over a free-running unidirectional clutch, a further brake C are also arranged. The second planet carrier 143 of the step-down planetary gearing 14 is connected to a free-running unidirectional clutch 17, supported on the transmission housing 16 and to a brake D. The output from the transmission 1 is the ring gear 144 of the step-down planetary gearing 14 and the shaft 145.

From the table in FIG. 2 it can be easily seen which clutches A, B, E are closed and which brakes C, C', D are activated and which solenoid valves MV1-MV3 (referred to the above-mentioned 4HP22 transmission) are closed in the individual speeds and are switched on- and off by the electric-hydraulic control, and in the case of the solenoid valves by the electronic control device 5 (FIG. 3), and with reference to the couplings and brakes, are actuated by system pressure.

Figure 3:
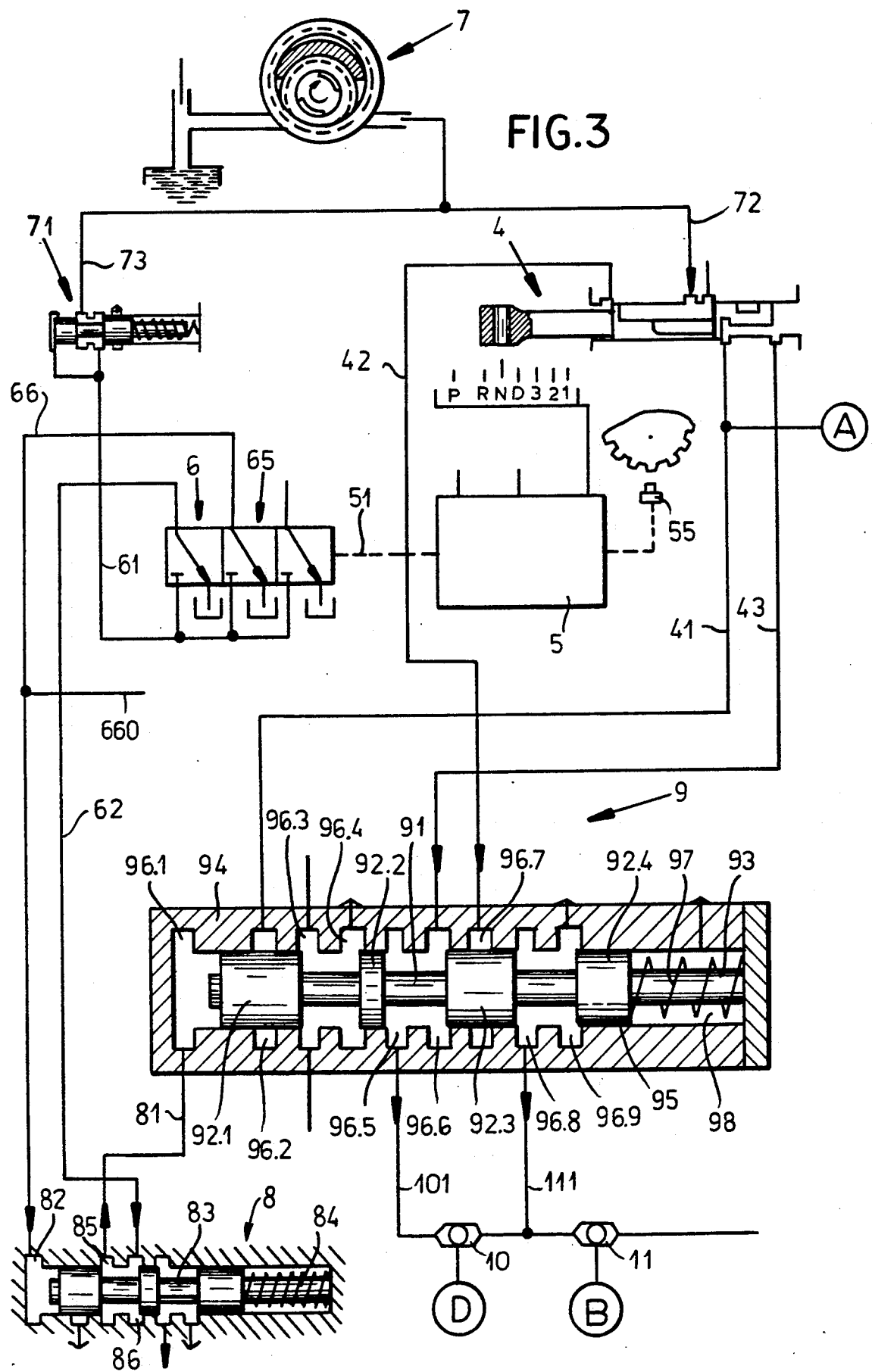
FIG. 3 is a control diagram, illustrated in a simplified manner, with the R-speed safety device.

In the control diagram presented of FIG. 3, the electronic device 5 is shown to be electrically connected to the solenoid valves 6, 65. A system pressure produced by the pressure medium source 7 is directed by the duct 72 to the selecting slide or manual valve 4 and by the duct 73 to the pressure-reducing valve 71.

Over the duct 61, this reduced pressure is supplied as control pressure to the solenoid valves, e.g. solenoid valves 6, 65 corresponding to the valves MV1, MV2, MV3 mentioned earlier. When the second solenoid valve 65 is switched on, this control pressure is directed via the duct 66 for the switching of a control valve 8 in the left frontal annular space 82, so that the spool valve 83 is brought to an axial end position (as shown) against the pressure of a spring 84.

Over a further duct, 660, a switch valve 2-3 is (second speed to third speed shifting);

When the first solenoid valve 6 is switched on, control pressure is directed via duct 62, through the third and second annular spaces 86, 85 and, via the duct 81 system pressure is also supplied to the frontal annular space 96.1 of the switch valve 9 (switch valve 1-2).

Besides the shifting of the gears 1 and 2, this switch valve 9 is also used for the R-speed safety and consists of spool valve 91 with four control pistons 92.1-92.4, which is axially slidably supported in a bore 95 of a housing 94, whereby the control pistons cooperate with nine annular spaces 96.1-96.9. When not acted upon by the control pressure, the control piston is kept in the left end position by a spring 97 arranged around a stop pin 93, and is brought into the right end position by the control pressure over the frontal annular space 96.1.

From the manual valve 4 the ducts 41, 42, 43 lead to the second annular space 96.2, to the seventh annular 96.7 and to the sixth annular space 96.6 The duct 41 has at the same time also a connection to the clutch A.

The fourth and ninth annular spaces 96.4 and 96.9, as well as the spring area 98 are vented and from the fifth annular space 96.5 a duct 101 leads to the ball valve 10 and the brake D. The eighth annular space 96.8 is connected to the brake D via the duct 111 and the ball valve 10, and the clutch B via the ball valve 11.

The safety mechanism for the R-speed via the solenoid valve 9 and the switch valve 9 works as follows:

With the shifting of the manual valve 4 in the position R, the system pressure from the pressure-medium source 7 is directed via duct 72 and 42 to the seventh annular space 96.7 of the switch valve 9, which is blocked by the third control piston 92.3, over a given forward driving speed.

The electronic control device 5 reads the driving speed over by a sensor 55, located for instance at the driven shaft 145 of the transmission. When the given forward drive speed is reached or the speed falls below this given forward drive speed, the electronic control device 5 switches off the first solenoid valve 6. The first solenoid valve is also switched off when, after a shifting into the R-gear the given forward drive speed is reached after a delay. The frontal annular space 96.1 is then vented via the control duct 81, control valve 8 and the duct 62 and the spring 97 moves the sleeve valve 91 into the left end position. Between the third control piston 92.3 and the fourth control piston 92.4 a connection is established from the seventh annular space 96.7 to the eighth annular space 96.8, so that system pressure is supplied through the duct 111 and the two ball valves 10 and 11 to the brake D and clutch B, which effectuate the reverse driving (see the table of FIG. 2).

I claim:

1. An automatically shiftable transmission for a vehicle having a plurality of forward speeds and including a gear mechanism having a first clutch effective to switch the gear mechanism into a low forward speed and a second clutch effective to switch said gear mechanism into a reverse speed, and an electrohydraulic control system, said system comprising:

a pressure medium source supplying a system pressure to said control system;

a manual selecting valve connected to said source and receiving said system pressure for selecting between a first forward drive position actuating said first clutch, other forward drive positions, a reverse drive position and a neutral position;

an electronic control device connected with said manual valve and provided with a sensor detecting an output speed of said transmission;

electrohydraulic control means connected with said electronic control devices and including a first solenoid valve and a second solenoid valve for supplying a control pressure to control shifting between said speeds, said first solenoid valve switching said first solenoid valve on in said first forward drive position of said manual valve;

a control valve receiving said control pressure from said first and second solenoid valves; and a hydraulic switch valve connected with the first and second clutches for controlling actuation thereof and with said manual valve for receiving said system pressure therefrom, said hydraulic switch valve being agreeable to shift said speeds in response to said solenoid valves and being connected with said control valve for receiving said control pressure, said switch valve being provided with means for preventing an automatic shifting of said gear mechanism into said reverse drive position by blocking flow of the system pressure between said switch valve and the second clutch or forward speed of the transmission and for unblocking the system pressure connecting said switch valve and said second clutch upon switching off of said first solenoid valve and effecting thereby the engagement of the second clutch controlling said reverse drive, said first solenoid valve being switched off by said sensor when a forward speed of the vehicle falls below a given speed regardless of the drive position selected by said manual valve.

2. The transmission defined in claim 1 wherein said control system further comprises a pressure-medium reducing valve receiving said system pressure from said pressure-medium source and connected with said electrohydraulic control means, said control pressure being distributed along control pressure lines.

3. The transmission defined in claim 1 wherein the system pressure flows along system pressure lines connecting said switch valve and said manual valve.

4. The transmission defined in claim 1 wherein said means for preventing and blocking includes a spool valve slidable axially in a body of said switch valve provided with a bore and nine annular spaces, said spool valve being formed with:

four control pistons spaced axially from one another, and
a stop pin,
a spring surrounding said stop pin and braced against one of said pistons and counteracting said control pressure received by one of said annular spaces operatively connected with said first solenoid valve and spaced axially from said pin, said system pressure being received by respective other annular spaces through separate system pressure lines, said spaces communicating with one another upon a displacement of said spool valve corresponding to one of said forward, reverse or neutral drive positions selected by said manual valve and defining the respective engagement of said first and second clutches.

5. The transmission defined in claim 4 wherein two of said annular spaces communicate with said second clutch through respective system pressure lines and through respective ball valves.

6. The transmission defined in claim 5 wherein one of said two annular spaces communicating with the second clutch is connected to a brake through the respective ball valve.

7. The transmission defined in claim 4 wherein:

a first one of said annular spaces for actuation with said control pressure is connected with said first solenoid valve via a control duct from said control valve and is connected with said second solenoid valve through said control valve;

system pressure is supplied from said manual valve to a second one of said annular spaces and to first clutch to a sixth one of said annular spaces in said first speed position of said manual valve and with a seventh of said annular spaces in said reverse drive position of said manual valve;

a third of said annular spaces being connected to further switched valves and clutches;

a fourth and a ninth of said annular spaces and a space receiving said spring being vented;

a fifth of said annular space is connected with a brake of said gear mechanism actuatable to switch said transmission into reverse drive through a first ball valve; and an eighth of said annular space is connected to said second clutch and to said brake respectively through a second ball valve and said first ball valve.

8. The transmission defined in claim 7 wherein said manual valve and said switch valve are so constructed that, when said manual valve is shifted from forward drive into reverse drive when said forward speed exceeds said given speed, said switch valve remains in a first extreme position cutting off supply of said system pressure through said ninth annular space to said second clutch and said brake by one of said controlled pistons.

9. The transmission defined in claim 7 wherein said manual valve and said switch valve are so constructed that, when said manual valve is shifted from forward drive into reverse drive position when said forward speed has fallen below said given value, said first solenoid valve is switched off by said electronic controlled device and said first annular space is vented through said control valve, said spool valve being pressed into an extreme position by said spring so that said system pressure actuates said second clutch and said brake from said seventh annular space through said eighth annular space and both of said ball valves.

* * * * *